United States Patent [19]

von Bonin

[11] Patent Number: 5,604,024

[45] Date of Patent: Feb. 18, 1997

[54] PRODUCTS OF REACTION OF AN ALUMINUM COMPOUND, A BORON-CONTAINING ACID, A PHOSPHORUS-CONTAINING ACID AND AN AMINE

[75] Inventor: Wulf von Bonin, Odenthal, Germany

[73] Assignee: Bayer Aktiengesellschaft, Leverkusen, Germany

[21] Appl. No.: 337,791

[22] Filed: Nov. 14, 1994

[30] Foreign Application Priority Data

Nov. 19, 1993 [DE] Germany .......................... 43 39 474.4

[51] Int. Cl.$^6$ .......................... B32B 33/00; C09K 21/04; C09K 21/12

[52] U.S. Cl. .......................... 442/6; 252/606; 428/319.1; 428/473; 428/537.1; 428/537.5; 428/702; 428/704; 428/540; 428/543; 428/913; 428/920; 442/52; 442/136; 442/138; 442/228

[58] Field of Search .......................... 252/606; 428/242, 428/253, 255, 263, 283, 288, 289, 292, 319.1, 473, 537.1, 537.5, 702, 704, 540, 543, 913, 920

[56] References Cited

U.S. PATENT DOCUMENTS

| | | | |
|---|---|---|---|
| 4,076,540 | 2/1978 | Stossel | 427/288 |
| 4,209,056 | 6/1980 | Gardikes et al. | 106/38.3 |
| 4,913,847 | 4/1990 | Tüker . | |
| 5,156,775 | 10/1992 | Blount | 252/609 |
| 5,182,049 | 1/1993 | von Bonin . | |
| 5,328,719 | 7/1994 | von Bonin | 106/18.3 |
| 5,425,901 | 6/1995 | von Bonin et al. . | |

FOREIGN PATENT DOCUMENTS

| | | |
|---|---|---|
| 0306677 | 3/1989 | European Pat. Off. . |
| 0468259 | 1/1992 | European Pat. Off. . |
| 0527401 | 2/1993 | European Pat. Off. . |
| 0596322 | 5/1994 | European Pat. Off. . |
| 2382959 | 10/1978 | France . |
| 4140966 | 6/1993 | Germany . |
| 1601402 | 10/1981 | United Kingdom . |

*Primary Examiner*—James C. Cannon
*Attorney, Agent, or Firm*—Sprung Horn Kramer & Woods

[57] ABSTRACT

Products of reaction of an aluminum compound (A), a boron-containing acid (B), a phosphorus-containing acid (P) and an amine (N) are characterized in that 1 mol of (A) has been reacted with from 0.3 to 1.19 mol of B, (from 1.8 to 2.19)+x mol of P and (from 0.3 to 3.69)+y mol of N, where x=from −1.5 to +1.5 and y=from 0 to 12. These reaction products may contain, if desired, up to 30 mol of water per mole of A employed and may be used in a very wide variety of ways, for example as binders, coating compositions or insulating material.

11 Claims, No Drawings

PRODUCTS OF REACTION OF AN ALUMINUM COMPOUND, A BORON-CONTAINING ACID, A PHOSPHORUS-CONTAINING ACID AND AN AMINE

The present invention relates to products of reaction of an aluminium compound, a boron-containing acid, a phosphorus-containing acid and an amine, to aqueous formulations thereof, to the preparation of appropriate binders, and to their use for a wide variety of purposes.

Aqueous solutions containing a product of reaction of one mole of aluminium hydroxide and one mole of orthophosphoric acid are not stable, since insoluble aluminium phosphate separates out from them over the course of time.

Boric acid forms with ortho-phosphoric acid a boron phosphate which is likewise insoluble. On the other hand, ortho-boric acid ($B(OH)_3$) forms soluble amine salts while aluminium hydroxide ($Al(OH)_3$) does not.

Aluminium phosphates with a low propensity to precipitate are obtained by using more than one mole of orthophosphoric acid per mole of aluminium hydroxide in an aqueous medium.

Crystalline deposits of aluminium phosphates and boron phosphates do not possess binder properties, since the crystallites have only a low adhesion capacity. Binder properties would only be expected of such phosphates if they were deposited in amorphous vitreous form. Amorphous glasses of this kind can be formed in a melt at temperatures above 1000° C., although this renders them devoid of interest for the preparation of binders because of the high temperatures to be employed.

Earlier patent applications of the current Applicant described water-soluble combinations of aluminium phosphates, amine salts and boric acids, which undergo ceramicization and vitrification at elevated temperatures, accompanied by foaming, and can be used, for example, for fire protection purposes. However, these combinations have a different composition: they are richer in boric acid and phosphoric acid than the products of the present invention, based on the aluminium content.

Products with high contents of boron exhibit a particularly strong intumescence behaviour, which is not always desired.

Products of reaction of an aluminium compound (A), a boron-containing acid (B), a phosphorus-containing acid (P) and an amine (N) have now been found, which are characterized in that 1 mol of A has been reacted with from 0.3 to 1.19 mol of B, (from 1.8 to 2.19)+x mol of P and (from 0.3 to 3.69)+y mol of N, where x=from −1.5 to +1.5 and y=from 0 to 12, and the reaction products contain, if desired, up to 30 mol of water per mole of A employed.

In preferred reaction products according to the invention, 1 mol of A is reacted with from 0.8 to 1.19 mol of B, from 1.8 to 2.19 mol of P and from 1.8 to 3.19 mol of N.

These preferred reaction products contain, if desired, up to 12 mol of water per mole of A employed.

A from 5 to 95% strength by weight aqueous solution of the reaction products according to the invention constitutes a manageable formulation thereof. Preferred are such aqueous solutions having a strength of from 40 to 80% by weight.

Aluminium hydroxide is particularly suitable as the aluminium compound (A). Also suitable, however, are chemically equivalent aluminium compounds from which aluminium phosphates can be formed by reaction with phosphoric acids, examples being aluminium oxides, aluminium oxide hydrates, aluminium acetates, aluminium formates, aluminium citrates, aluminium nitrates, aluminium halides and aluminium carbonates.

Orthoboric acid is particularly suitable as the boron-containing acid (B). However, it is also possible to employ chemically equivalent boron compounds from which orthoboric acid can be formed in aqueous medium, examples being boron oxides, their hydration products, and borates.

Orthophosphoric acid is particularly suitable as the phosphorus-containing acid (P). Also suitable are chemically equivalent phosphorus compounds from which orthophosphoric acid can be formed, examples being phosphorus oxides, phosphorus halides, phosphorus esters, and their products of hydrolysis and of hydration.

As amines (N), mono-, di- and triethanolamine and ammonia are particularly suitable. Other water-soluble mono-, di- and polyamines and their alkoxylation products, especially their ethoxylation products, are also suitable, examples being ethylenediamine, propylenediamine, polyethylenepolyamines, polypropylenepolyamines, hexamethylenediamine, morpholine, piperazine, methylamine, dimethylamine, ethylamine, N-dimethyl-1,3-propylenediamine, dihydroxyethylethylenediamine and N-methyl-ethanolamine. Mixtures of different amines and mixtures of amines with ammonia can also be employed.

The starting materials are preferably reacted in an aqueous or water-containing medium. The reaction of boric acid with amine, in particular, can also be carried out without water, although in this case too at least small additions of water are of advantage.

For example, it is possible first to prepare a reaction product of an aluminium compound with a phosphorus-containing acid in aqueous medium. It is preferred to work in a from 30 to 85% strength by weight, in particular a from 50 to 75% strength by weight, aqueous solution and at from 50° to 100° C., or if desired at an even higher temperature. In this context it has been found to be particularly suitable to add solid aluminium hydroxide as a powder to an initial heated charge of phosphoric acid, with vigorous stirring.

It is then possible to prepare a reaction product of a boron-containing acid with an amine or mixture of amines. In this reaction water may, if desired, be present. In this case it has been found appropriate to add the boron-containing acid as a solid to the initial amine charge, with vigorous stirring, at for example from 10° to 120° C., preferably from 50° to 95° C.

The two separately prepared reaction products can then be reacted to give the reaction product according to the invention by thorough mixing at, for example, from 50° to 120° C., preferably from 70° to 95° C. In this case it has proved expedient to meter in one component, preferably the aluminium phosphate solution, to the other component, which has been preheated at, for example, from 50° to 120° C., preferably from 70° to 95° C. with thorough mixing. Stirring is preferably carried out until a substantially clear solution is obtained. The mixture can then be diluted, if desired, with water, or concentrated and then cooled. In this way a solution of reaction products according to the invention is obtained which is stable on storage, i.e. which has no tendency to develop crystalline precipitations.

If desired, it is also possible for this solution to be modified further, for example by adding auxiliaries, fillers and/or additives. These include surfactants, colorants, plasticizers (preferably alkoxylated amines), glycols, antioxidants, hydrophobicizing agents (based preferably on fatty amines, silicones or organic fluorine compounds), fillers and mixtures of fillers (e.g. metals such as nickel, aluminium, silver, copper and gold, and also glass, wood, carbon, starch, metal oxides, metal silicates, ground minerals, plastics, sand, silicic acids and quartz) in the form of powders, crystallites, solid or hollow spheres, platelets or dumbbells, and fibres, wires, woven fabrics, knitted fabrics, strands and meshes (for example based on mineral-inorganic, organic, mixed organic-mineral or metallic substances). It is also possible to choose thermally expandable additives, for example expandable silicates, borosilicates, mica, graphites (in non-expanded, partially or completely expanded form), and in this context the reaction products according to the invention may also function as binders for such additives.

If the reaction products according to the invention are employed as binders, their binding can take place by heat treatment at, for example, from 100° to 600° C., preferably from 150° to 300° C., whereby they can be converted to a hard, water-resistant state. The same also applies to coating and impregnation operations carried out using the reaction products according to the invention. In many cases even the degree of water resistance which can be achieved by drying at below 100° C. is sufficient. Coatings dried in this way also exhibit a marked anti-fogging effect, i.e. in warm, humid air they prevent misting of the surface treated with them.

In a similar manner to aluminium phosphates, zeolites and acid clays, dried reaction-products according to the invention, or those heat-treated at, for example, up to 1400° C., also have catalytic effects, for example in the conversion of hydrocarbons. For this purpose, it is advantageous to employ the products on supports which have been heat-treated at, for example, from 200° to 1400° C. and which may have undergone oxidative alteration in the process.

The reaction products according to the invention and their liquid formulations are of interest, for example, as impregnating materials for absorbent substrates, for instance paper, wood, membranes, porous carbon, organic and inorganic nonwovens, foam materials, woven, knitted, laid and mesh fabrics and strands. They impart to these materials, in the moist, dried or post-heated state, flame retardance and fire resistance, and also intumescent behaviour. Paper, seals, fabrics and foam materials treated in this way can be used for fire protection purposes.

On textiles, reaction products according to the invention exhibit a finish effect, and in the detergent sector they exhibit a sequestrant effect. In the finishing of leather they have tanning and filling properties. As an additive to cements, plaster and mortars they regulate the setting properties.

Where the novel products are present in dried and optionally powdered form, preferred drying temperatures being those from 10° to 180° C. they can be combined by stirring with water or polymer dispersions to give fireproofing mortars having a good intumescence effect, and can also be used as joint-filling compositions. In the solid form or, having been heated to temperatures of between 200° and 500° C., in expanded form they can also be used as fillers for synthetic resins, thermoplastics, elastomers and coating materials.

The heating of powdered reaction products according to the invention, in moulds or without moulds, at temperatures of more than 200° C. leads to largely mineral foam materials with densities of, for example, from 100 to 900 g/l, which can be used as incombustible insulating materials of high temperature resistance, for example in sandwich form.

Particular interest is attached to the use of the reaction products according to the invention as binders, which can be employed in solution or powder form, for vermiculites, perlites and, in particular, graphites which may, if desired, be expandable, either partially or completely expanded or not yet expanded, for the production of expandable or non-expandable shaped components having electrical and thermal conductivity.

It is also possible to add reaction products according to the invention, in aqueous solution, to glazes, enamels or ceramic slips, or as binders for ceramics. The addition to loam and brick or tile clay followed just by air drying leads to improved strength and stability to moisture. Another possibility is the consolidation of layers of earth by injecting solutions of reaction products according to the invention. Addition to paper pulps leads to improved sizability and dry strength of the paper produced therefrom.

Reaction products according to the invention which are present in granule form can be compression moulded, for example at from 130° to 280° C. to give clear, solid mouldings which can be used as construction elements for preventive fire protection, since in unfilled, filled or fibre-reinforced form they exhibit intumescence when exposed to flames, expanding to give highly fire-resistant, ceramicized barriers to fire.

Alternatively, by employing high temperatures, for example in a stream of hot air or in a flame, such granules can be expanded to form porous granules having bulk densities of between, for example, 20 and 300 g/l which can be used as insulating and packing material.

The reaction products according to the invention have a quite general binder character and possess the advantage that they can be obtained from aqueous solutions at temperatures far below 1000° C. and thus in a simple and cost-effective way. They are resistant to temperatures of up to 1000° C. or more. The reaction products according to the invention surprisingly exhibit an amorphous, vitreous and in some cases even thermoplastic character.

By drying solutions which contain reaction products according to the invention at temperatures of, for example, from 180° to 370° C., preferably from 200° to 350° C., it is possible to separate out vitreous aluminium phosphates or aluminium boron phosphates which are insoluble in water. Examples of those particularly suitable for this purpose are the products of reaction of one mole of aluminium hydroxide and about 2 mol of ortho-phosphoric acid, which have been obtained using products of reaction of one mole of ortho-boric acid with 2 or more moles of an amine. Alkanolamines such as monoethanolamine, in combination if desired with ammonia, are particularly suitable in this context. Applied from an aqueous medium, such formulations even at about 250° C. form insoluble, vitreous coatings having a binder character. The pH of their aqueous solutions is, for example, between 3 and 9, preferably between 4 and 8. Such coatings are of particular interest for metals, wood, plastics and paper.

Binders containing reaction products according to the invention, especially those binders encompassed by the preferred composition, can be dried from aqueous solutions, even at low temperatures—for example at between room temperature and 250° C.—to give clear films having a certain flexibility; these films are no longer dissolved by water and have an intumescent character which although evident is moderate, which is of interest, for example, for fire-retardant coatings.

The fact that reaction products according to the invention only contain approximately one phosphates group for each atom of aluminium and of boron means that ultimately, at elevated temperatures, they give rise to neutral and—as is known—insoluble aluminium phosphate and boron phosphate, devoid of polyphosphate or polyborate groups. Such polyphosphate and polyborate groups would make the binders susceptible to hydrolysis, i.e. not water-resistant in the long term. Moreover, it has been shown that low contents of boron favour transition to the water-insoluble state at relatively low temperatures. Finally, for reasons of industrial and ecological availability, products with a minimal boron content are regarded as advantageous.

EXAMPLES

Unless otherwise stated, indications of parts, ratios and percentages are by weight.

EXAMPLE 1

Preparation of an Aluminium Phosphate Solution 693 parts of an aqueous 85% strength by weight orthophosphoric acid and 200 parts of water were heated to 50° C., and then 234 parts of aluminium hydroxide in powder form were scattered in with stirring. Stirring was continued at 100° C. for one hour, to form a clear solution which was diluted with a further 150 parts of cold water and was cooled with stirring.

EXAMPLE 2

Preparation of Boric Acid Solutions a) 50 parts of water and 305 parts of monoethanolamine were added to 186 parts of orthoboric acid and the mixture was stirred at 70° C. for one hour, to form a clear solution.

b) The procedure was as in a), but employing a further 62 parts of monoethanolamine.

c) The procedure was as in a), but additionally employing a further 183 parts of monoethanolamine.

d) The procedure was as in a), but additionally employing 400 parts of a 25% strength by weight aqueous ammonia solution.

e) The procedure was as in a), but additionally employing 105 parts of diethanolamine and 149 parts of triethanolamine.

f) The procedure was as in a), but also using, in addition, 60 parts of ethylenediamine and 40 parts of triethylenetetraamine.

EXAMPLE 3

Preparation of Products According to the Invention

The solutions prepared in accordance with Example 2 a) to 2 f) were heated at 70° C., and then the aluminium phosphate solution from Example 1 was passed in, in each case over the course of 30 minutes with intensive mixing, and the mixture was stirred at 90° C. for 3 hours, to give in each case clear solutions having pHs in the range from 5 to 8.

All of the solutions dried at room temperature and at 90° C. to give clear films. The products prepared from solutions 2 a) and 2 b) formed thixotropic gels after cooling. The products obtained from solutions 2 c), 2 e) and 2 f) formed viscous liquids which were readily pourable. The product prepared from solution 2 d) was a pasty thixotropic composition which was particularly suitable for coating purposes.

Samples from all of the solutions prepared were dried at 120° C. and, after comminution, were obtained in the form of readily manageable, non-tacky powders.

EXAMPLE 4

From the products obtained in accordance with Example 3 from solutions 2 a), 2 b), 2 c), 2 e) and 2 f) granules having average diameters, within the range from 2 to 5 mm were prepared and were passed, on a screen of heat-resistant stainless steel wire, through a natural-gas flame burning at about 900° C. The flame section was 150 cm long and the rate of conveyance was 0.5 m/min. On contact with the flame the granules foamed up by several 100 per cent by volume to form light foam granules having bulk densities of between 20 and 80 g/l. They were after-heated at 350° C. for 10 minutes then, after cooling, they can be used as an insulating material, for example for cavity filling. They have the advantage of being water-resistant and non-flammable.

EXAMPLE 5

A cotton cloth was impregnated with a 10% strength by weight aqueous solution of the product prepared in accordance with Example 3 from solution 2 c) and was wrung out. After the cloth had dried it was ironed, giving a finish-like stiffening to the material which no longer continued to burn outside an ignition flame.

EXAMPLE 6

A degreased steel panel about 1 mm thick was coated with a solution, heated to 70° C., prepared in accordance with Example 3 from solution 2 b). After the panel had cooled it bore a firmly adhering gel coat which dried at room temperature. The panel was then heated to 350° C. by applying a heating element to the reverse. When this was done the coating material on the other side of the panel foamed up to form an insulating foam. Panels of this kind can be used in furnace construction. When the furnace is operated for the first time the interior insulating layer desired is formed in the cavities.

EXAMPLE 7

Using a lambskin roller, the solution obtained in accordance with Example 3, prepared using the product from Example 2 d), was applied to a 3 mm thick beech plywood panel. After drying, a 1.5 mm thick coating film was obtained on the surface of the wood, which was resistant to splashed water.

The central point of the coated side of a 30×30 cm section of this plywood, in the horizontal position, was subjected for one minute to the flame from a natural-gas Bunsen burner (about 1000° C.).

At the point at which the flame was applied, a formation of ceramicized intumescence foam more than 1 cm thick developed, while the reverse face of the wood remained virtually unchanged. There was no continuation of burning. Fireproof wooden doors can be produced using sheets coated in this way on one or both sides.

A corresponding beech plywood panel which had not been treated was consumed by combustion in this test; the reverse face had discoloured to brown after only 30 seconds.

EXAMPLE 8

The procedure of Example 7 was repeated, but the product solution used had been obtained from the solution of Example 2 c). This solution was of low viscosity and therefore had a better penetration and impregnating capacity. The resulting film was clear and free from cracks. The result of flame application was comparable with that of Example 7.

Analogous results were obtained when a solution was used which additionally contained 6% of carbon black pigment or 8% of titanium dioxide pigment.

EXAMPLE 9

A kaolin fibre felt band 3 mm thick was impregnated to saturation point twice using a solution prepared in accordance with Example 3 from solution 2 c), and was then initially dried. 1900 g of solids per m$^2$ had been taken up. The band was conditioned at room temperature and at an atmospheric humidity of 70% and then inserted into a joint between two fireclay bricks. The joint was then subjected for 2 hours to the flame from an oil burner, during which temperatures of up to 1200° C. were reached. In the fire test the space in the 2 cm deep joint had been closed off, and afterwards the joint was assessed. It was found that the whole of the joint had been completely filled with a ceramicized material and was closed.

EXAMPLE 10

The solution obtained in accordance with Example 3 from solution 2 d) was dried at 120° C. and powdered. The fractions between 0.3 and 0.8 mm particle diameter were then extracted by screening. 5500 g of granules from these fractions were scattered into a 1 m$^2$ steel slab mould with an internal height of 3 cm, which was lined with aluminium foil. The mould was closed, placed in an oven preheated to 600° C. and maintained at this temperature for 1 hour, gases given off being allowed to escape from the mould at the edges. The oven was then cooled slowly over the course of 12 hours and a slab of a fine-pored foamed mineral material was removed from the mould. The density of the slab was 150 g/l. Slabs of this kind can be used as insulating material at high temperatures.

EXAMPLE 11

A commercially available paper (kraft type) was impregnated to saturation with the solution obtained in accordance with Example 3 from the solution of Example 2 c), and was then wrung out and dried at room temperature. The flexible paper impregnated in this way could be converted into a ceramicized material by flame treatment without burning. Using such paper it is possible to instal provisional fire protection barriers, by inserting balls of the paper into cable passages or apertures in masonry which are to be protected, or by wrapping such paper around plastic pipes.

EXAMPLE 12

Gauze bandages were coated with a 1 mm thick layer of the gel obtained from solution 2 b) in accordance with Example 3. In the wet condition the bandages remained flexible and could be rolled up, while in the dried state they became rigid and mechanically stable. While still in the wet state they were wound around a plastic pipe to be protected. When subjected to a flame the pipe was then mechanically stabilized and thermally insulated.

When bandaging material comprising thermoplastic fibres (mixture of polyamide and polyester) was used, a good foaming behaviour was observed in the wound protective bandage.

EXAMPLE 13

A solution prepared in accordance with Example 3 from solution 2 d) was dried at 120° C. and powdered in a ball mill. 150 parts of this material were then incorporated into 100 parts of ethylene-vinyl acetate copolymer (vinyl acetate content 45%). A 3 mm thick sheet, crosslinked using peroxide, was produced from this mixture by compression moulding and was subjected to a flame. In the region of the flame a foamed, porous, mechanically stable and insulating mass was formed from the elastomer. When this mixture is used as a cable sheathing material it is not consumed by combustion but forms an electrically and thermally insulating protective cover.

EXAMPLE 14

The solution prepared from Example 2 a) in accordance with Example 3 was incorporated at 85° C. into an open-pored strip of flexible polyurethane foam. The strip was then cooled, the solution solidifying in a gel-like manner and filling the foam material while conserving the flexibility of the latter. The foam material treated in this way was sealed inside a polyolefin film and in this form was storable, i.e. it did not dry out and harden.

The packaged foam material was pressed into a cable bulkhead, an operation which was possible with ease because of the flexibility and clean, ready manageability of the material. The package was then opened, whereupon drying took place to give a solid closure. In this way the bulkhead was sealed without problems and, in the event of fire, proved to be protected against the passage of smoke and heat.

EXAMPLE 15

The powder obtained in accordance with Example 10 was incorporated into a commercially available alkyd resin coating material in a ratio of 1:1. A pinewood panel was coated with the material and, after the coating had hardened, was subjected to a flame. At the point where the flame was applied a porous, insulating layer of mineral material was formed which protected the wood against catching alight and burning.

EXAMPLE 16

The powder obtained in accordance with Example 13 was incorporated into a styrene-containing, polymerizable formulation of a commercially available unsaturated polyester resin in a ratio of 1:1. Using the resin a glass fibre mat was impregnated and wound to form a pipe. After hardening the pipe was subjected to a flame. In this case, although the pyrolysis gases produced by the organic material caught alight, the pipe itself retained its mechanical integrity and was ceramicized at the point where the flame was applied.

Accordingly, using such pipes, protective devices for electrical lines and switching elements can be produced.

EXAMPLE 17

Melamine and a solution obtained in accordance with Example 3 from solution 2 c) were mixed in a ratio of 1:1. A mixture was obtained which could be coated easily by brush, and was painted onto wood. After it had dried a flame was applied from a gas burner. At the point where the flame was applied, a porous ceramic intumescence foam was formed and the wood did not catch alight.

The same coating material was applied to an aluminium panel which, when subjected to a flame, in contrast to a corresponding but untreated aluminium panel, did not collapse and did not melt.

EXAMPLE 18

A stainless steel wire screen with mesh size of 2 mm was impregnated with the solution obtained in accordance with Example 3 from solution 2 c) and dried, and this operation was repeated until the covering of the wires meant that the average mesh size had been reduced to 1 mm. A stream of hot air at a temperature of 400° C. was passed through this screen, whereupon the coating expanded and sealed the screen. Screens of this kind can be used as flame barriers in ventilation systems.

What is claimed is:

1. The product of a reaction of an aluminium compound (A), a boron-containing acid (B), a phosphorus-containing acid (P) and an amine (N), in which reaction 1 mol of (A) has been reacted in aqueous medium with from 0.8 to 1.19 mol of B, (from 1.8 to 2.19)+x mol of P and (from 0.3 to 3.69)+y mol of N, where x=from −1.5 to +1.5 and y=from 0 to 12.

2. A product of claim 1 which additionally contains up to 30 mol of water per mole of A employed.

3. A product of claim 1, in which in the reaction 1 mol of A has been reacted with from 0.8 to 1.19 mol of B, from 1.8 to 2.19 mol of P and from 1.8 to 3.19 mol of N.

4. A product of claim 3 which additionally contains up to 12 mol of water per mole of A employed.

5. A product of claim 1 which is present in the form of an 5 to 95% strength by weight aqueous solution.

6. A product of claim 1 which is present in the form dried at from 10° to 180° C.

7. A product of claim 1 which has been obtained by reacting an aluminium compound with a phosphorus-containing acid in a from 30 to 85% strength by weight medium at from 50° to 100° C., by reacting a boron-containing acid with an amine or amine mixture at from 10° to 120° C., and mixing the two reaction products thus obtained at from 50° to 120° C.

8. A product of claim 1 which has been obtained by reacting aluminium hydroxide, ortho-boric acid, ortho-phosphoric acid and an amine selected from the group consisting of mono-, di- and triethanolamine and ammonia.

9. A substrate coated with a product of claim 1.

10. A fiber substrate impregnated with a binder comprising the product of claim 1.

11. The product of claim 1 post-cured by heating at 100° to 600° C.

* * * * *